(12) United States Patent
Willis (10) Patent No.: US 8,643,692 B2
(45) Date of Patent: Feb. 4, 2014

(54) VIDEO CONFERENCING UTILIZING A CABLE SET-TOP BOX

(75) Inventor: Kellee Willis, Wichita, KS (US)

(73) Assignee: Cox Communications, Inc., Atlanta, GA (US)

( * ) Notice: Subject to any disclaimer, the term of this patent is extended or adjusted under 35 U.S.C. 154(b) by 618 days.

(21) Appl. No.: 12/710,874

(22) Filed: Feb. 23, 2010

(65) Prior Publication Data

US 2011/0205329 A1    Aug. 25, 2011

(51) Int. Cl.
  *H04N 7/14*    (2006.01)
(52) U.S. Cl.
  USPC ............ 348/14.01; 348/14.04; 709/201; 709/217; 709/231
(58) Field of Classification Search
  USPC ............ 348/14.01–14.16; 370/259–271, 370/351–357; 455/412.1–426.2, 455/550.1–560, 575.1–575.9, 90.1–90.3; 709/201–207, 217–248
  See application file for complete search history.

(56) References Cited

U.S. PATENT DOCUMENTS

| | | | | |
|---|---|---|---|---|
| 5,689,553 A * | 11/1997 | Ahuja et al. | ............ | 379/202.01 |
| 5,754,641 A * | 5/1998 | Voit et al. | ............ | 379/354 |
| 7,006,613 B2 * | 2/2006 | Novak et al. | ............ | 379/142.01 |
| 7,099,288 B1 * | 8/2006 | Parker et al. | ............ | 370/259 |
| 7,573,498 B1 * | 8/2009 | Dhanoa et al. | ............ | 348/14.04 |
| 2003/0041333 A1 * | 2/2003 | Allen et al. | ............ | 725/106 |
| 2004/0151168 A1 * | 8/2004 | Phillips et al. | ............ | 370/359 |
| 2006/0088145 A1 * | 4/2006 | Reed et al. | ............ | 379/88.19 |

* cited by examiner

Primary Examiner — Hemant Patel
(74) Attorney, Agent, or Firm — Merchant & Gould (57) ABSTRACT

Video conferencing using a set-top box in a cable television services system is provided. A video call may be received over a network connection from a calling party device at a receiving set-top box in the cable television services system. The video call may be displayed on a display device connected to the receiving set-top box.

20 Claims, 5 Drawing Sheets

VIDEO CONFERENCING UTILIZING A CABLE SET-TOP BOX

BACKGROUND

Video conferencing is becoming increasingly accessible to users of computer networks due to the proliferation of video capture devices (i.e., "webcams") which, in combination with a personal computer connected to the Internet, enable the computer to act as a video conferencing station by sending and receiving video with other users. Cable television services systems provide subscribers with access to the Internet (via a broadband cable modem) as well as separate access to programming on a connected television via a cable set-top box. Currently however, computer-based video conferencing typically requires at least a computer, a webcam, a broadband cable modem, a computer monitor (for viewing video), and speakers for listening to audio associated with the video. Thus, subscribers utilizing cable television services systems for Internet access are currently limited to using the aforementioned equipment for video conferencing. It is with respect to these and other considerations that the present invention has been made.

SUMMARY

Embodiments are directed to providing video conferencing using a set-top box in a cable television services system. A video call may be received over a network connection from a calling party device at a receiving set-top box in the cable television services system. The video call may then be displayed on a display device connected to the receiving set-top box.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are directed to providing video conferencing using a set-top box in a cable television services system. A video call may be received over a network connection from a calling party device at a receiving set-top box in the cable television services system. The video call may then be displayed on a display device connected to the receiving set-top box.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1A:
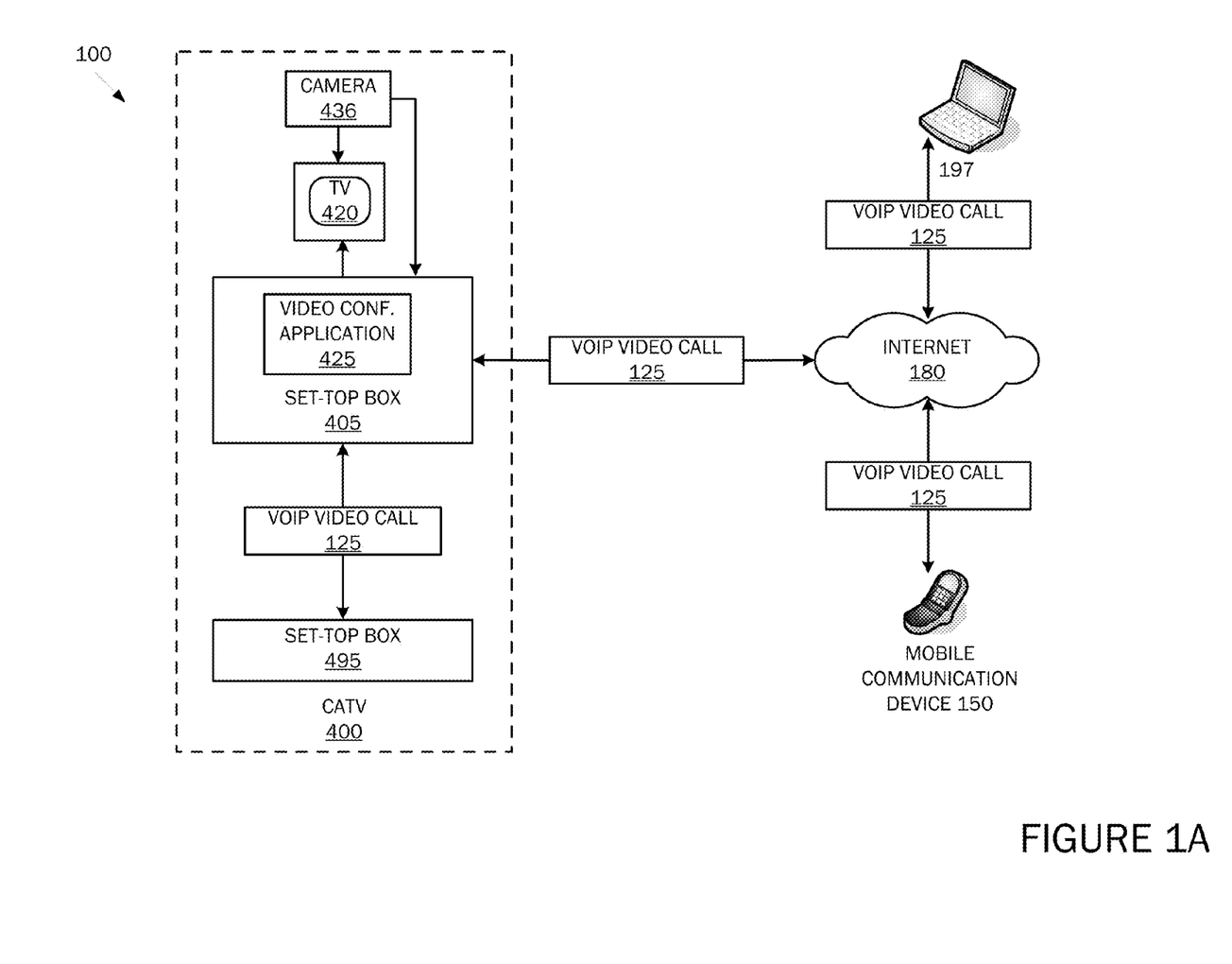
FIG. 1A is block diagram illustrating a communication network architecture that serves as an exemplary operating environment, according to various embodiments.

Referring now to the drawings, in which like numerals represent like elements through the several figures, various aspects of the present invention will be described. FIG. 1A is a block diagram illustrating a communication network architecture 100 that may serve an exemplary operating environment, according to various embodiments. As should be understood, the illustrative communication network architecture 100 of FIG. 1A is for purposes of example and is not limiting of a variety of communications configurations that may be utilized as described herein.

The communication network architecture 100 includes a cable television ("CATV") services system 400. The CATV 400 may include a set-top box 405. In accordance with various embodiments, the set-top box 405 may store and execute a video conferencing application 425 for initiating video conferencing calls with other communication devices, such as the set-top box 495, the computer 197 and the mobile communication device 150. In accordance with an embodiment, the set-top box 405 may be connected to a television ("TV") 420 and a camera 436. In accordance with another embodiment, a set-top box 405 may be a device comprising a physical MAC address, which may be an external device, or alternatively, an internal component of a TV 420. The TV 420 may be utilized to display a video conference call received by the set-top box 405. In particular, in accordance with an embodiment, the video conference call may comprise a Voice over Internet Protocol ("VoIP") video call 125. The camera 436, which may also be connected to the TV 420, may comprise a webcam for receiving and sending video images and audio to send in a VoIP video call 125 between the set-top box 405 and the set-top box 495, the computer 197 or the mobile communication device 150. In accordance with another embodiment, the camera 436 may be integrated with the TV 420.

In accordance with an embodiment, the set-top box 405 may utilize the CATV services system 400 to communicate with the computer 197 and the mobile communication device 150 over the Internet 180. The computer 197 may include a general purpose desktop, laptop, handheld, tablet, or other type of computer capable of executing one or more application programs. As should be appreciated by those skilled in the art, the computer 197 may comprise conventional components (not shown) including a central processing unit, a system memory, a basic input/output system, a mass storage device for storing programs (including an operating system), input and output devices (such as a keyboard and display device), and a network interface for communicating over the Internet 180. The computer 197 may also be configured with a camera and application software to enable the sending and receiving of the VoIP video call 125 over the Internet 180 with the set-top box 405. The mobile communication device 150 may comprise a mobile telephone with computer functionality (i.e., a "smartphone"). In accordance with an embodiment, the mobile communication device 150 may be operative to run application programs as well as access the Internet 180. The mobile communication device 150 may also be configured with a camera and application software to enable the sending and receiving of the VoIP video call 125 over the Internet 180 with the set-top box 405. It should be appreciated that both the computer 197 and the mobile communication device 150 may be configured for wireless communication to distributed computing networks, such as the Internet 180, via a wireless fidelity ("Wi-Fi") based system.

Figure 1B:
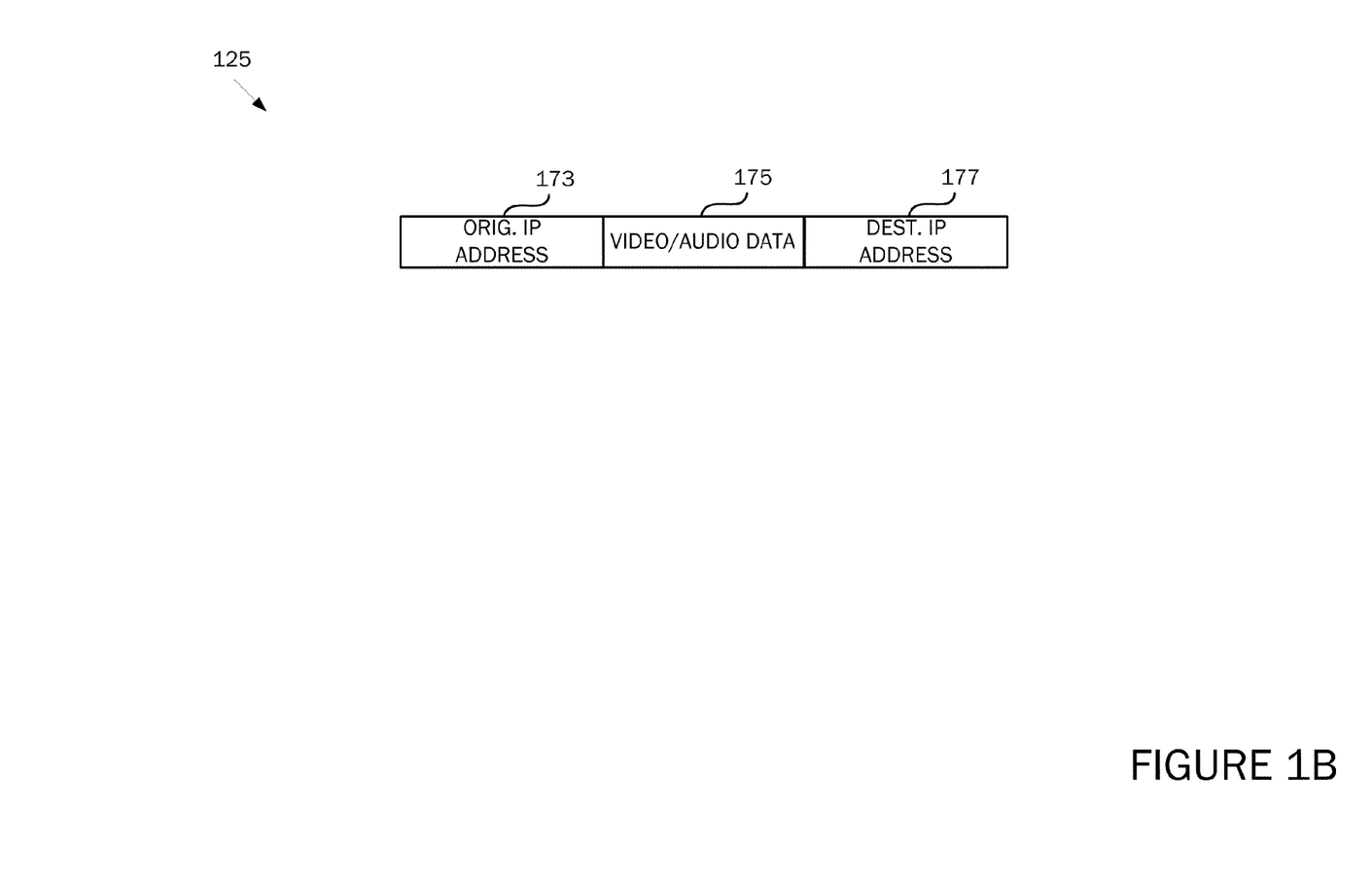
FIG. 1B is a block diagram of components making up a video conference call, according to various embodiments.

FIG. 1B is a block diagram of components making up a video conference call (i.e., the VoIP video call 125), according to various embodiments. In particular, the VoIP video call 125 may comprise an originating Internet Protocol ("IP") address 173, video/audio data 175, and a destination IP address 177. In accordance with an embodiment, the originating IP address 173 and the destination IP address 177 may be utilized to establish a path for communicating the video/audio data 175 between the set-top box 405 and a called party device. In particular, the originating IP address 173 may be an IP address which is assigned to the set-top box 405 by the CATV services system 400 for communicating video and audio data to another IP address associated with the set-top box 495 (within the CATV services system 400), the computer 197, and the mobile communication device 150. It should be appreciated by those skilled in the art that the video conference application 425 may be utilized as a platform for providing an interface so that the set-top box 405 may communicate the VoIP video call 125 within the CATV services system 400 as well as over the Internet 180. An illustrative platform which may be utilized in accordance with an embodiment comprises the SHOWRUNNER application marketed by ROVI CORPORATON of Santa Clara, Calif.

Figure 2:
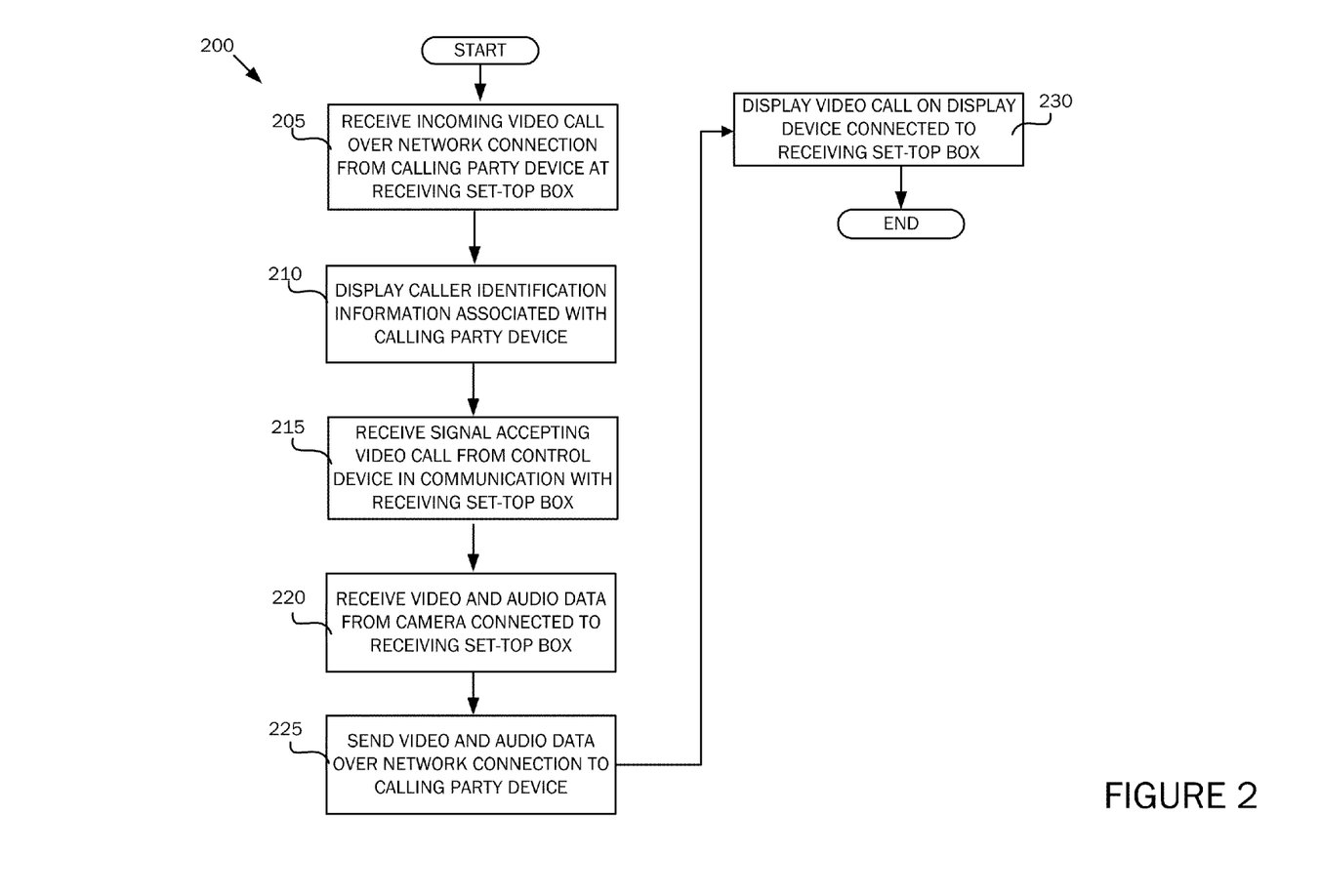
FIG. 2 is a flow diagram showing an illustrative routine for providing video conferencing using a set-top box in a cable television services system, according to an embodiment.

Having described an illustrative operating environment 100 with respect to FIG. 1A and having described an illustrative diagram of components making up the VoIP video call 125 with respect to FIG. 1B, FIG. 2 is a flow diagram showing an illustrative routine 200 for providing video conferencing using a set-top box in a cable television services system, according to an embodiment. The routine 200 begins at operation 205 where the set-top box 405 in the CATV services system 400 may receive an incoming video call over a network connection from a calling party device in the operating environment 100. In particular, the set-top box 405 may receive a VoIP video call 125 from the set-top box 495 over a cable network connection (e.g., a hybrid fiber coax ("HFC") network connection) within the CATV services system 400 or alternatively, receive a VoIP video call 125 from either the computer 197 or the mobile communication device 150 over a network connection between the set-top box 405 and the Internet 180. For example, the set-top box 405 may receive the audio/video data 175 (comprising video and audio associated with the VoIP video call 125) sent from an originating IP address 175 associated with either the set-top box 495, the computer 197, or the mobile communication device 150, at a destination IP address 177 associated with the set-top box 405

From operation 205, the routine 200 continues at operation 210 where the set-top box 205 may display, on the TV 420, caller identification information associated with the calling party device sending the VoIP video call 125 to the set-top box 405. For example, within the audio/video data 175, the set-top box 495 may include identification information associated with a user of the set-top box 495 for display on the TV 420.

From operation 210, the routine 200 continues at operation 215 where the set-top box 405 may receive a signal accepting the VoIP video call 125 from a control device in communication with the set-top box 405. For example, a user of the set-top box 405, upon viewing caller identification information in the incoming VoIP video call 125 from the set-top box 495, may press a button on a remote control associated with the set-top box 405 to accept the VoIP video call 125 so that audio and video data associated with the call may be displayed on the TV 420.

From operation 215, the routine 200 continues at operation 220 where the set-top box 405 may receive video and audio data from the connected camera 436. In particular, once the VoIP video call 125 has been accepted by a user of the set-top box 405, the camera 436 may be activated so that audio and video associated with the user may be sent by the set-top box 405 over a network connection to the calling party device (e.g., the set-top box 495, the computer 197, or the mobile communication device 150).

From operation 220, the routine 200 continues at operation 225 where the set-top box 405 may send the video and audio data received from the camera 436 over a network connection to the calling party device (e.g., the set-top box 495, the computer 197, or the mobile communication device 150).

From operation 225, the routine 200 continues at operation 230 where the set-top box 405 displays the VoIP video call 125 on the TV 420. From operation 230, the routine 200 then ends.

Figure 3:
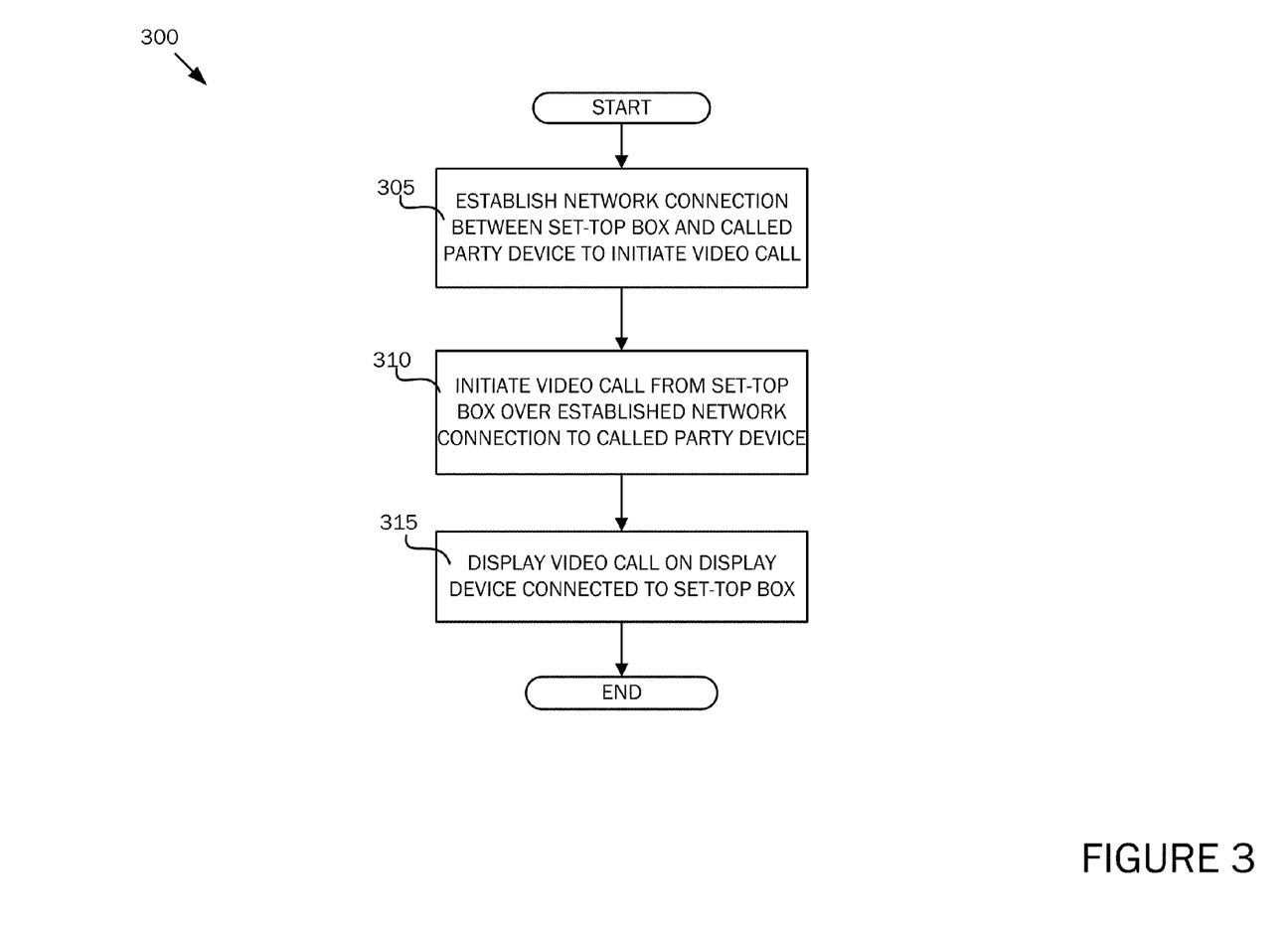
FIG. 3 is a flow diagram showing an illustrative routine for providing video conferencing using a set-top box in a cable television services system, according to another embodiment.

FIG. 3 is a flow diagram showing an illustrative routine 300 for providing video conferencing using a set-top box in a cable television services system, according to another embodiment. The routine 300 begins at operation 305 where the set-top box 405 in the CATV services system 400 may establish a network connection between the set-top box 405 and a called party device to initiate a video call (i.e., a VoIP video call 125). In particular, the set-top box 405 may establish a cable network connection (e.g., a hybrid fiber coax ("HFC") network connection) with the set-top box 495 within the CATV services system 400 or alternatively, establish a network connection with either the computer 197 or the mobile communication device 150 over the Internet 180. In accordance with an embodiment, the network connection may be established between an originating IP address 173 associated with the set-top box 405 and a destination IP address 177 associated with the set-top box 495, the computer 197, or the mobile communication device 150.

From operation 305, the routine 300 continues at operation 310, where the set-top box 405 initiates a video call to a called party device. In particular, the video conferencing application 425 executing on the set-top box 405 may be configured to receive video and audio data from the camera 426 connected to the set-top box and to send the video and audio data over the established network connection to either the set-top box 495, the computer 197, or the mobile communication device 150.

From operation 310, the routine 300 continues at operation 315, where the set-top box 405 displays the initiated video call (e.g., a VoIP call 125) with a called party device on the TV 420. From operation 315, the routine 300 then ends.

Figure 4:
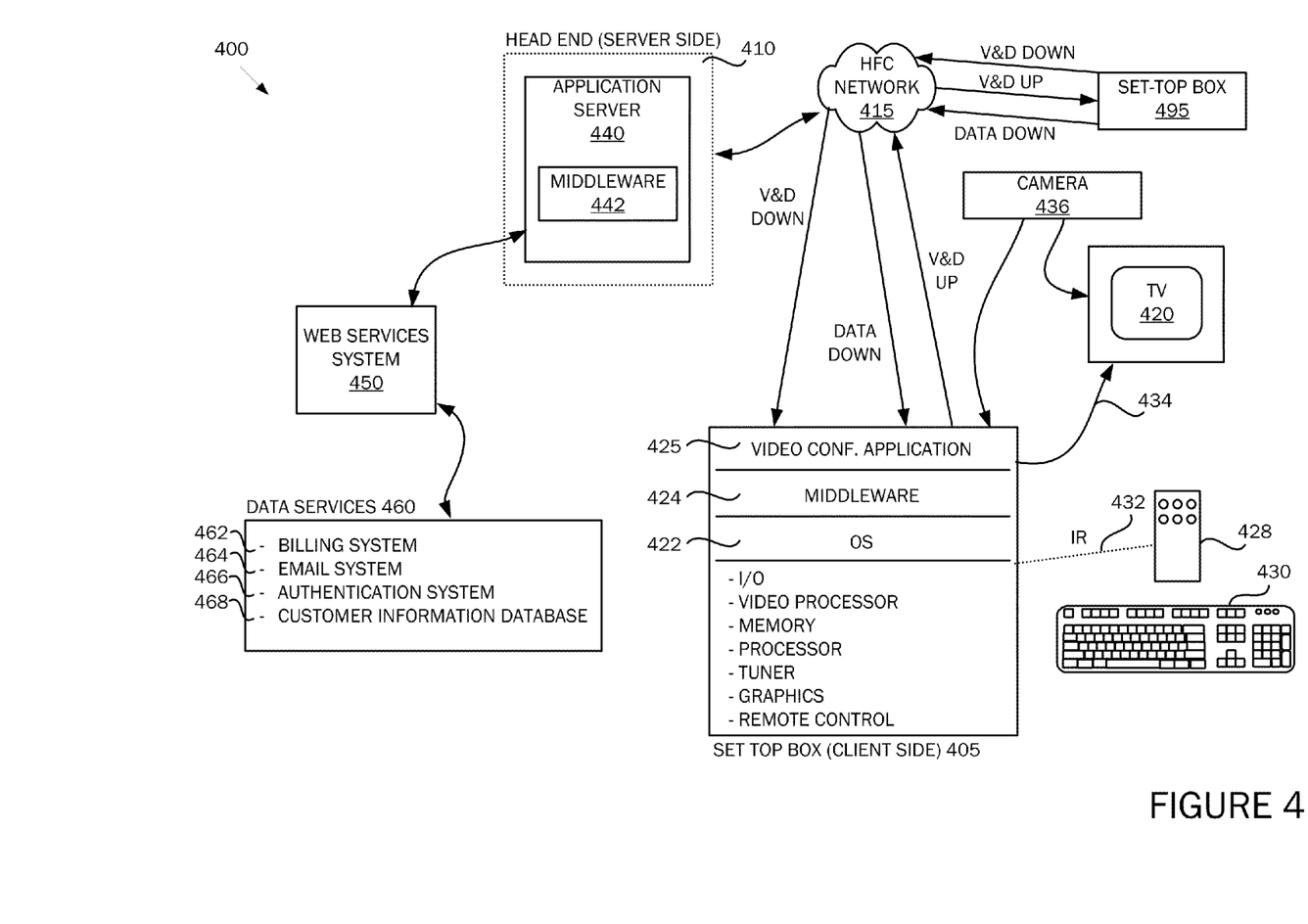
FIG. 4 is a block diagram of a cable television services system architecture, according to various embodiments.

FIG. 4 is a block diagram of a cable television ("CATV") services system architecture 400, according to various embodiments. Communication between the communication network architecture 100 illustrated in FIG. 1 and the CATV services system illustrated in FIG. 4 may be accomplished via any suitable wireline or wireless connectivity between the communication network architecture 100 and the CATV services system 400.

Referring now to FIG. 4, digital and analog video programming, information content and interactive television services are provided via a hybrid fiber coax (HFC) network 415 to the television 420 for consumption by a cable television/services system customer. As is known to those skilled in the art, HFC networks 415 combine both optical fiber and coaxial cable lines. Typically, optical fiber runs from the cable head end 410 to neighborhoods of 500 to 2,000 customers. Coaxial cable runs from the optical fiber feeders to each customer. According to embodiments of the present invention, the functionality of the HFC network 415 allows for efficient bidirectional data flow between the client-side set-top boxes 405 and 495, and the server-side application server 440.

According to various embodiments, the CATV system 400 is in the form of a distributed client-server computing system for providing video and data flow across the HFC network 415 between server-side services providers (e.g., cable television/services providers) via a server-side head end 410 and a client-side customer via a client-side set-top box functionally connected to a customer receiving device, such as the television 420. As is understood by those skilled in the art, modern CATV systems 400 may provide a variety of services across the HFC network 415 including traditional digital and analog video programming, telephone services, high speed Internet access, video-on-demand, and information services.

On the client side of the CATV system 400, digital and analog video programming and digital and analog data are provided to the television 420 via the set-top box 405. Interactive television services that allow a customer to input data to the CATV system 400 likewise are provided by the set-top box 405. As illustrated in FIG. 4, the set-top box 405 may comprise a multipurpose computing device having a computer processor, memory and an input/output mechanism. The input/output mechanism receives input from server-side processes via the HFC network 415 and from customers via input devices such as a remote control device 428 and a keyboard 430. The remote control device 428 and the keyboard 430 may communicate with the set-top box 405 via a suitable communication transport such as an infrared connection 432. The set-top box 405 may also include a video processor for processing and providing digital and analog video signaling to the television set 420 via a cable communication transport 434. A multi-channel tuner is provided for processing video and data to and from the set-top box 405 and a server-side head end system 410, described below.

The set-top box 405 may also include an operating system 422 for directing the functions of the set-top box 405 in conjunction with the video conferencing application 425. Because a variety of different operating systems 422 may be utilized by a variety of different brands and types of set-top boxes, a middleware layer 424 is provided to allow a given software application to be executed by a variety of different operating systems. According to an embodiment, the middleware layer 424 may include a set of application programming interfaces ("APIs") that are exposed to the video conferencing application 425 and operating systems 422 that allow the video conferencing application 425 to communicate with the operating systems through common data calls understood via the API set. As described below, a corresponding middleware layer is included on the server side of the CATV services system 400 for facilitating communication between the server-side application server and the client-side set-top boxes 405 and 495. According to an embodiment, the middleware layer 442 of the server-side application server and the middleware layer 424 of the set-top box 405 format data passed between the client side and server side according to the Extensible Markup Language (XML).

The set-top box 405 may pass digital and analog video and data signaling to the television 420 via a one-way communication transport 434. The set-top box 405 may receive video and data from the server side of the CATV system 400 via the HFC network 415 through a video/data downlink and data via a data downlink. The STB 405 may transmit video and data from the client side of the CATV system 400 to the server side of the CATV system 400 via the HFC network 415 via a video and data uplink. The video/data downlink is an "in band" downlink that allows for digital and analog video and data signaling from the server side of the CATV system 400 through the HFC network 415 to the set-top box 405 for use by the set-top box 405 and for distribution to the television set 420. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 4, between the HFC network 415 and the set-top box 405 comprise "out of band" data links. As is understand by those skilled in the art, the "out of band" frequency range generally lies between zero and 54 megahertz. According to various embodiments, data flow between the client-side set-top box 405 and the server-side application server 440 is typically passed through the "out of band" data links. Alternatively, an "in band" data carousel may be positioned in an "in band" channel into which a data feed may be processed from the server-side application server 440 through the HFC network 415 to the client-side set-top box 405. Operation of data transport between components of the CATV system 400, described with reference to FIG. 4, is well known to those skilled in the art.

According to one embodiment data passed between the CATV system backend components such as the head end 410 and the CATV system front end components such as the set-top box 405 may be passed according to the Data Over Cable Service Interface Specification (DOCSIS). As is well known to those skilled in the art, DOCSIS provides for a mechanism for data transport over a cable system such as the CATV services system 400, illustrated in FIG. 4. Among other things, DOCSIS allows for the passing of digital communications and Internet connectivity over an HFC network 415.

Referring still to FIG. 4, the head end 410 of the CATV system 400 is positioned on the server side of the CATV system and includes hardware and software systems responsible for originating and managing content for distributing through the HFC network 415 to the client-side set-top box for presentation to customers via the television 420. As described above, a number of services may be provided by the CATV system 400, including digital and analog video programming, interactive television services, telephone services, video-on-demand services, targeted advertising, and provision of information content.

The application server 440 is a general-purpose computing system operative to assemble and manage data sent to and received from the client-side set-top box 405 via the HFC network 415. As described above with reference to the set-top box 405, the application server 440 may include a middleware layer 442 for processing and preparing data from the head end of the CATV services system 400 for receipt and use by the client-side set-top box 405.

According to embodiments of the present invention, the application server 440 obtains customer profile data from services provider data services 460 for preparing a customer profile that may be utilized by the set-top box 405 for tailoring certain content provided to the customer. According to an embodiment of the present invention, a customer profile may include communications applications provisioned on networked set-top boxes, as well as, designations of individual set-top boxes in a home, business or facility (e.g., "kitchen set-top box," "bedroom set-top box," "office set-top box," and the like).

As illustrated in FIG. 4, the services provider data services 460 include a number of services operated by the services provider of the CATV services system 400 which may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. The customer information database 468 may include general information about customers such as place of employment, business address, business telephone number and demographic information such as age, gender, educational level, and the like. As should be understood by those skilled in the art, the disparate data services systems 462, 464, 466, 468 are illustrated as a collection of data services for purposes of example only. The example data services systems comprising the data services 460 may operate as separate data services systems, which communicate with a web services system (described below) along a number of different communication paths and according to a number of different communication protocols.

Referring still to FIG. 4, a web services system 450 is illustrated between the application server 440 and the data services 460. According to embodiments of the present invention, the web services system 450 serves as a collection point for data requested from each of the disparate data services systems comprising the data services 460. When the application server 440 requires customer profile data from one or more of the data services 460 for preparation or update of a customer profile, the application server 440 passes a data query to the web services system 450. The web services system formulates a data query to each of the available data services systems for obtaining any available data for a given customer as identified by a set-top box identification associated with the customer. The web services system 450 serves as an abstraction layer between the various data services systems and the application server 440. That is, the application server 440 is not required to communicate with the disparate data services systems, nor is the application server 440 required to understand the data structures or data types utilized by the disparate data services systems. The web services system 450 is operative to communicate with each of the disparate data services systems for obtaining necessary customer profile data. The customer profile data obtained by the web services system is assembled and is returned to the application server 440 for ultimate processing via the middleware layer 442, as described above.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of providing video conferencing using a set-top box in a cable television services system, comprising:
   receiving a video call at a receiving set-top box in the cable television services system, the video call being received directly over a network connection from a calling party device, the network connection comprising a hybrid fiber coax (HFC) network connection; and
   displaying the video call on a display device connected to the receiving set-top box, the video call comprising a data feed which is processed through the HFC network connection to the receiving set-top box by an in band data carousel, the in band data carousel being positioned in an in band channel.

2. The method of claim 1, wherein receiving a video call over a network connection from a calling party device at a receiving set-top box in the cable television services system comprises receiving a video call over a network connection between at least one of a sending set-top box and the receiving set-top box, a computer and the receiving set-top box, and a mobile communication device and the receiving set-top box.

3. The method of claim 1, wherein receiving a video call over a network connection from a calling party device at a receiving set-top box in the cable television services system comprises receiving a video call over a network connection comprising an originating Internet protocol address associated with the calling party device and a destination Internet protocol address associated with the receiving set-top box.

4. The method of claim 1, wherein receiving a video call over a network connection from a calling party device at a receiving set-top box in the cable television services system comprises receiving a voice over Internet protocol video call from the calling party device at the receiving set-top box.

5. The method of claim 1, further comprising displaying, on the display device connected to the receiving set-top box, caller identification information associated with the calling party device prior to displaying the video call.

6. The method of claim 5, further comprising receiving a signal accepting the video call from a control device in communication with the receiving set-top box.

7. The method of claim 1, further comprising:
   receiving video and audio data from a camera connected to the set-top box upon receiving the video call from the calling party device; and
   sending the video and audio data over the network connection to the calling party device.

8. A method of providing video conferencing using a set-top box in a cable television services system, comprising:
   establishing a network connection directly between the set-top box in the cable television services system and a called party device to initiate a video call, the network connection comprising a hybrid fiber coax (HFC) network connection;
   initiating the video call from the set-top box over the established network connection to the called party device; and
   displaying the video call on a display device connected to the set-top box, the video call comprising a data feed which is processed through the HFC network connection to the set-top box by an in band data carousel, the in band data carousel being positioned in an in band channel.

9. The method of claim 8, wherein establishing a network connection between the set-top box in the cable television services system and a called party device to initiate a video call comprises establishing a network connection between the set-top box and another set-top box in the cable television services system to initiate the video call.

10. The method of claim 8, wherein establishing a network connection between the set-top box in the cable television services system and a called party device to initiate a video call comprises establishing a network connection between the set-top box and at least one of a computer and a mobile communication device.

11. The method of claim 8, wherein establishing a network connection between the set-top box in the cable television services system and a called party device to initiate a video call comprises establishing a network connection between an originating Internet protocol address associated with the set-top box and a destination Internet protocol address associated with the called party device.

12. The method of claim 9, wherein establishing a network connection between an Internet Protocol address associated with the set-top box and an Internet Protocol address associated with the called party device comprises receiving an Internet Protocol assigned to the set-top box in the cable television services system.

13. The method of claim 8, wherein initiating the video call from the set-top box over the established connection to the called party device comprises:
    receiving video and audio data from a camera connected to the set-top box; and
    sending the video and audio data over the established network connection to the called party device.

14. The method of claim 8, wherein initiating the video call from the set-top box over the established network connection to the called party device comprises utilizing voice over Internet protocol to send the video call from the set-top box over the established network connection to the called party device.

15. A method of providing video conferencing using a set-top box in a cable television services system, comprising:
    receiving a video call at a receiving set-top box in the cable television services system, the video call being received directly over a network connection from a calling party device, the network connection comprising a hybrid fiber coax (HFC) network connection;
    receiving video and audio data over a camera connected to the receiving set-top box upon receiving the video call from the calling party device;
    sending the video and audio data over the network connection to the calling party device; and
    displaying the video call on a display device connected to the receiving set-top box, the video call comprising a data feed which is processed through the HFC network connection to the receiving set-top box by an in band data carousel, the in band data carousel being positioned in an in band channel.

16. The method of claim 15, wherein receiving a video call over a network connection from a calling party device at a receiving set-top box in the cable television services system comprises receiving the video call over a network connection between at least one of a sending set-top box and the receiving set-top box, a computer and the receiving set-top box, and a mobile communication device and the receiving set-top box.

17. The method of claim 15, wherein receiving a video call over a network connection from a calling party device at a receiving set-top box in the cable television services system comprises receiving the video call over a network connection comprising an originating Internet protocol address associated with the calling party device and a destination Internet protocol address associated with the receiving set-top box.

18. The method of claim 15, wherein receiving a video call over a network connection from a calling party device at a receiving set-top box in the cable television services system comprises receiving a voice over Internet protocol video call from the calling party device at the receiving set-top box.

19. The method of claim 15, further comprising displaying, on the display device connected to the receiving set-top box, caller identification information associated with the calling party device prior to displaying the video call.

20. The method of claim 19, further comprising receiving a signal accepting the video call from a control device in communication with the receiving set-top box.

* * * * *